Figures 1, 2:
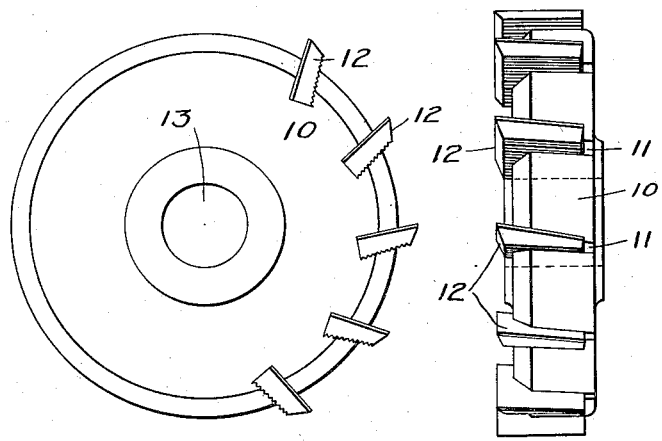

June 3, 1930.   R. R. WEDDELL   1,762,110
COMPOUND TAPER INSERTABLE BLADE LOCK
Filed Jan. 6, 1928    2 Sheets-Sheet 1

Inventor
Ralph R. Weddell
By Attorneys.
Nathan & Bowman

June 3, 1930.                R. R. WEDDELL                1,762,110
              COMPOUND TAPER INSERTABLE BLADE LOCK
                    Filed Jan. 6, 1928        2 Sheets-Sheet 2

Inventor
Ralph R. Weddell
By  Attorneys.
Nathan & Bowman

Patented June 3, 1930

1,762,110

UNITED STATES PATENT OFFICE

RALPH R. WEDDELL, OF SHELTON, CONNECTICUT, ASSIGNOR TO THE O. K. TOOL COMPANY, INC., OF NEW YORK, N. Y., A CORPORATION OF NEW YORK

COMPOUND-TAPER INSERTABLE-BLADE LOCK

Application filed January 6, 1928. Serial No. 244,834.

The present invention concerns cutter tools of the inserted blade type. The advantages of removable cutter blades in cutter tools were early recognized and were especially enhanced by the discovery and steady improvement of high speed or alloy steels. The quantity and quality of the product turned out by the modern machine tool is dependent to a large extent upon the cutter tool. The cutter tool is accordingly required to withstand enormous strains in the normal operation and must therefore be of as rigid construction as possible. The ideal construction to meet this requirement would be a cutter tool made in a single solid piece. It is, however, impractical to make cutter tools solid, especially when provided with alloy steel cutter bits. Such a construction would render the cutter tool expensive and difficult to machine. It is further desirable to make the corresponding elements of materials in accordance with the functions to be performed. With the inserted type of cutter, the body portion may be made of a strong, tough non-brittle material, whereas the blade is of an extremely hard material and unaffected by high temperatures.

With the development of cutters with inserted cutter bits, the idea was presented of making the bits adjustable to thus enable the size to be varied within certain limits and to compensate for wear and regrinding. Various means including such devices as keys, pins and shims with tapered openings were employed to effect this. Among the foremost of these devices was the idea of making the opening and inserted blade tapered whereby the blade was wedged into place. The idea was conceived of employing in conjunction with the wedging means a series of complemental serrations on a wall of the opening and the adjacent blade surface whereby the blade could be removed and re-inserted in a succeeding serration and thereby adjusted in the direction of wear, the blade being securely wedged into the adjusted position.

In a large number of types of cutters and work to be performed the wear may occur on two adjacent cutting edges arranged at an angle with each other. In such type cutter it became very desirable to adjust the cutter blade in both directions of wear. Accordingly means were developed for accomplishing this function, such means including certain auxiliary devices similar to those originally employed in accomplishing adjustment in a single direction.

By the present invention a double adjustment is easily accomplished without resorting to any auxiliary fastening or shimming devices, the general features of the invention including a holder having an opening therein tapered in two general directions with respect to the axis of the tool. Serrations are provided extending in the direction of one of the major tapers, the serrations being serially arranged transversely thereto which is in the direction of the other major taper. The inserted blade portion is of like shape. The adjustment is accomplished by removing the blade in the direction of the serrations and re-inserting it in the desired succeeding serration which results in a corresponding transverse adjustment equal to the distance between serrations, and since the side walls of the openings converge in this transverse direction, the blade will also be advanced longitudinally of the direction of the serrations. A double adjustment is thereby obtained, the relative amounts of which are dependent upon the respective amount of the transverse tapers.

The resulting tool comprises merely a body member and one or more cutter bits, each cutter bit being securely wedged into place and having a full bearing throughout the entire inserted portion. All looseness and inaccuracy resulting from the use of auxiliary devices is thereby eliminated and the rigidity of the solid cutting tool is very closely approached without the loss of any of the advantages accruing to an inserted type of cutter.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 3:
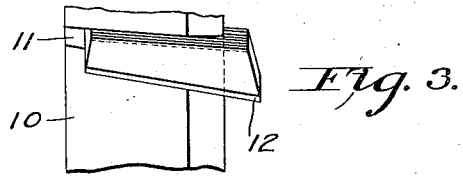
Figures 4, 5:
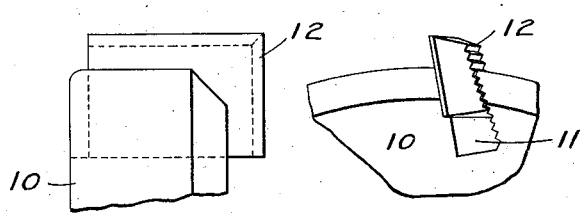
Figures 6, 7:
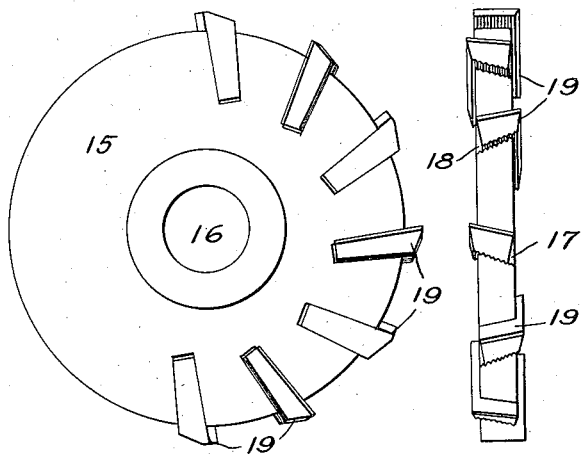
Figures 8, 9:
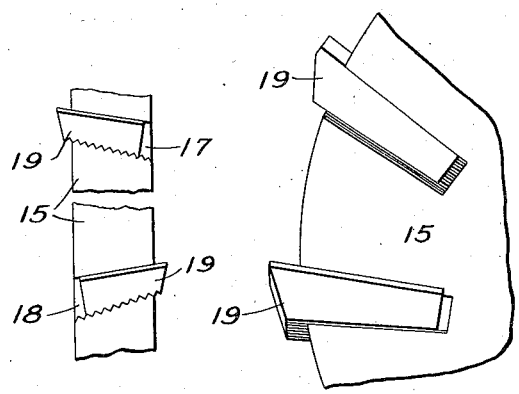

Figure 1 is an end elevational view of what is commonly known as a face milling cutter. Fig. 2 is a side elevational view thereof and Figs 3, 4 and 5 are enlarged partial views showing the details in a clear manner. A second form of cutter is illustrated in Figs. 6 to 9 of which Fig. 6 is a plan view of a side milling cutter; Fig. 7 is a side view thereof and Figs. 8 and 9 are enlarged detailed views showing the adjusting means to better advantage.

The invention as incorporated in the type of cutter shown in Figs. 1 to 5 includes a face mill having the rotary body portion 10 provided with cutter bit openings 11 therein adapted to receive the cutter bits or blades 12. The body portion 10 may be made of a strong, tough and non-brittle metal capable of withstanding the stresses transferred thereto, while the blades 12 are of a suitable alloy steel being extremely hard to withstand the treatment imposed upon such elements. The body portion may be mounted upon a suitable arbor inserted in the opening 13.

The respective openings are tapered in the general direction of the major axis of the rotating cutter and are likewise tapered in a direction transverse thereto which as shown may be substantially radial and perpendicular to the other taper and major axis. In order to give the cutter blades rake they may be, and usually are, arranged at a small angle to both the corresponding radial line and the longitudinal axis of the cutter. The directions of the tapers as stated throughout the case are therefore intended to designate the general direction thereof relative to the cutter rather than any specific angle.

As shown in Fig. 3 the opening 11 diverges outwardly to the right. Fig. 5 shows that the opening converges outwardly radially of the cutter. The major taper therefore extends, in Fig. 4 for instance, from the upper left hand corner to the lower right hand corner thereof.

Serrations are machined in the opening and blade extending in the general direction of the axis of the cutter tool. Such a means as may be now evident affords a double ajustment for the cutter blade. For example, in Fig. 5 the movement of the blade outwardly one serration results in the blade also being advanced a certain amount longitudinally of the opening that is, to the right in Fig. 4. This is due to the fact that the wider inner portion of the blade is moved toward the narrower outer portion of the opening 11 and therefore the tapered blade cannot enter the opening to the depth that it did in its former position. The blade in this re-adjusted position may be again wedged into place as tightly as in the preceding position. The normal forces acting on the cutter blade during the normal operation tend to more securely wedge the blade into its locked position.

A similar arrangement is illustrated in Figs. 6 to 9 which show what is generally termed a side milling cutter having the body portion 15 adapted to be mounted on an arbor inserted through the opening 16. The cutter body is provided with openings in the periphery thereof which diverge radially of the cutter. Alternate openings diverge in opposite directions transversely to the plane of the cutter and substantially parallel to the major axis. As shown in Figs. 7 and 8, for example, the openings 17 diverge toward the right while the openings 18 diverge to the left. By this means the total width of the cutter may be maintained by suitable adjustment of the blades and regrinding thereof. The arrangement in the present case is similar to that of Figs. 1 to 5. Adjustment of the blade 19, for example, in Fig. 8 by moving it to the left one or more serrations results in the blade protruding radially a correspondingly increased amount.

Another feature which contributes to the practicability of the present invention consists of forming the serrations in the successive openings in such a manner that a blade may be advanced a portion only of a serration by moving it to the next succeeding slot. In other words the succeeding openings have the serrations milled therein a small increment of the distance between two serrations in advance of the preceding opening. The blades, however, are all alike. Thus in moving a cutter blade successively around the cutter body the total advancement may be one or more serrations dependent upon the amount of off-set and the total number of slots. This admits of a finer adjustment and requires less grinding to sharpen the cutter blades after adjustment. In Figs. 6 to 9 the system is of course followed with respect to the corresponding alternate blades.

The features of the present invention are herein shown as incorporated in two types of cutters, both of which are rotary and have a plurality of blade openings therein. It is to be understood, however, that the invention is capable of application in other types of tools such as hollow mills, tools having a plurality or but a single tooth therein and likewise normally fixed or non-rotary tools. Such fixed tools may include for example an ordinary lathe tool having the body portion and the cutter bit mounted therein adapted to be adjusted simultaneously both in the general direction of the axis of the holder and transversely thereto.

The term outward adjustment as used throughout this specification is intended to mean in general outwardly from the supporting opening and in a hollow mill e. g. may actually be in a direction toward the axis.

With the arrangement shown the blades may be simultaneously adjusted by a single operation in a plurality of directions to compensate for wear and regrinding and also to adjust or maintain the size of the cutter tool and further has all the well known advantages accompanying cutter tools of the inserted cutter bit type. This is accomplished without the aid of any keys, screws, pins, shims or other auxiliary fastening devices which are subject to becoming loose or through inaccuracy afford but a partial bearing for the supported cutter element. The compound taper affords a wedging and interlocking arrangement which secures the blades in a rigid manner comparable to a solid single piece cutter but having further advantages of a simple and double adjustment in both cutting directions.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptions should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A cutter tool combining a body member; an opening therein adapted to receive a cutter bit said opening being tapered in two general directions one of which is axial of the body member and the other of which is substantially at right angles to the first direction; and a series of means extending in one of said directions adapted to co-act with complemental means on the cutter bit for selective positioning of the cutter bit in said member.

2. A cutter tool combining a body member having an opening in the outer surface thereof with its side walls diverging outwardly; a cutter bit having a portion tapered to receive a wedging fit in said opening; a series of serrations on a cutter bit surface and the adjacent side wall of the opening with the serrations extending in said outward direction, said opening and cutter bit being also tapered in a direction transverse to said outward direction whereby advancing the position of said bit one or more serrations toward the converging end of said transverse taper simultaneously causes the cutter bit to project a correspondingly increased amount in said outward direction.

3. A cutter tool combining a body member having a cutter bit opening therein, the side walls of which are at an angle to each other to form a wedge-shaped opening tapered in the general direction of the axis of the body member and substantially at right angles thereto; a cutter bit having a portion shaped in conformity therewith to receive a wedging fit in said opening, said cutter bit having cutting edges at an angle to each other; and a series of complemental formations on a surface of the inserted bit portion and the adjacent side wall of the opening, said wedge-shaped opening and formations being so arranged that selective outward positioning of the cutter bit in complemental formations of the body member results in the simultaneous advancement of each of the respective cutting edges in the direction of normal wear thereon.

4. A rotary cutter tool combining a body member having an opening therein tapered substantially axially and radially of said body member; a cutter blade correspondingly shaped to closely fit in said opening; and a series of interfitting means on a wall of said opening and the adjacent blade surface for locking said blade in selected adjusted positions.

5. A cutter tool combining a body member having an opening therein tapered in two directions transverse to each other one of which is substantially axially of the body member and the other of which is radially thereof; a cutter element closely conforming with the shape of said opening; and means on the complemental surfaces of one side of said element and the adjacent member wall comprising a series of similar formations on one surface and a coacting formation on the other surface for locking the blade in adjusted positions within said opening.

6. A cutter tool combining a supporting member having an opening therein with the opposed side walls converging toward each other both in the direction of the axis of the supporting member and transversely thereof; a cutter blade in said opening having a shape to conform with that of the opening; a series of similar formations on one side wall of said opening extending in one of said directions; and complemental formations on the adjacent blade surface whereby the blade may be selectively repositioned and secured in said member with the blade advanced in both said axial and transverse directions.

7. A rotary cutter tool combining a body member having an opening therein with its walls diverging in an outward direction and in a direction at substantially right angles thereto; a cutter bit shaped to conform with said opening; and a series of serrations on a side wall of said opening and the adjacent blade surface said serrations extending in said outward direction.

8. A cutter tool combining a body member having an opening in its outer surface with the side walls thereof diverging outwardly in a first direction and converging outwardly in a second direction transverse to said first direction; a series of grooves in one of said walls said grooves extending in said first outward direction; a cutter bit having a portion similar in shape to said opening adapted to fit therein; and a tongue on said portion adapted to be selectively engaged in said grooves, whereby said cutter bit may be selectively moved and secured in a position wherein the cutter bit is advanced in both of said outward directions.

9. A cutter tool combining a body member having an opening in its outer surface with the side walls diverging outwardly in a first direction and converging outwardly in a second direction transverse to said first direction; a cutter bit conforming in general shape to said opening for a wedging fit therein; a series of grooves in a surface of said bit, said grooves extending in said first outward direction; and a projecting tongue on the adjacent wall of said opening adapted to be selectively fitted in said grooves whereby said cutter bit may be secured in an advanced position with respect to both of said outward directions.

10. A rotary cutting tool combining a cylindrical member having a series of blade openings therein said openings being doubly tapered with the side walls, diverging in one outward direction and converging in another outward direction transverse to the first; blades in said openings shaped in accordance therewith; serrations on a side wall of each opening; complemental serrations on the respective adjacent blade surface, said serrations extending in the general direction of said outwardly diverging taper; whereby advancing of the blade outwardly toward the converging end one or more serrations causes the blade to project a correspondingly increased amount in the other outward direction.

11. A rotary cutter tool combining a body member having a series of cutter blade openings therein said openings being doubly tapered with the side walls diverging in an outward direction and in a direction at right angles thereto; blades correspondingly doubly tapered to receive a wedging lock in said openings; and serrations on a side wall of each opening and the adjacent blade surface, the serrations in the succeeding openings being progressively advanced by a small increment of a serration whereby the blades may be progressively advanced by movement from one opening to the succeeding ones.

12. A rotary cutting tool combining a body member having an opening therein said opening being tapered in a direction substantially parallel to the axis of the cutter and in a second direction substantially at right angles thereto; serrations on a side wall of said opening extending in one of said directions; and a cutter blade having a supporting portion correspondingly doubly tapered to receive a wedging fit in said opening and having serrations to correspond with those in the opening.

In witness whereof, I hereunto subscribe my name.

RALPH R. WEDDELL.